United States Patent [19]

Hirahara

[11] Patent Number: 5,572,413
[45] Date of Patent: Nov. 5, 1996

[54] PRIMARY CONTROL TYPE SWITCHING POWER SUPPLY CIRCUIT

[75] Inventor: Minoru Hirahara, Kawasaki, Japan

[73] Assignee: Fujitsu Limited, Kanagawa, Japan

[21] Appl. No.: 369,362

[22] Filed: Jan. 6, 1995

[30] Foreign Application Priority Data

Mar. 18, 1994 [JP] Japan .................................. 6-049555

[51] Int. Cl.$^6$ .................................................. H02M 3/335
[52] U.S. Cl. ........................................... 363/21; 363/97
[58] Field of Search ................................ 363/20, 21, 97; 323/222

[56] References Cited

U.S. PATENT DOCUMENTS

| | | | |
|---|---|---|---|
| 4,546,421 | 10/1985 | Bello et al. | 363/21 |
| 4,825,351 | 4/1989 | Uesugi | 323/222 X |

*Primary Examiner*—Peter S. Wong
*Assistant Examiner*—Y. J. Han

[57] ABSTRACT

A primary control type switching power supply circuit includes a transformer having a primary side and a secondary side, a control circuit generating a control signal based on a detection signal, a circuit for switching a current flowing through the primary side in response to the control signal so as to generate an A.C. voltage on the secondary side, a rectifying and smoothing circuit for rectifying and smoothing the A.C. voltage to generate an output voltage across first and second terminals, an output voltage detection circuit including a circuit part for comparing a reference voltage and a detection voltage that is based on the output voltage, and a detection signal transmitting part supplying to the control circuit the detection signal which is indicative of an error between the reference voltage and the detection voltage so that the output voltage is maintained constant based on the control signal, and a circuit including a choke coupled to one of the first and second terminals for turning the output voltage ON/OFF via the choke at a switching frequency and for obtaining a D.C. voltage by rectifying and smoothing an induced voltage of the choke caused by the ON/OFF of the output voltage. The D.C. voltage is supplied to the detection signal transmitting part of the output voltage detection circuit as a driving voltage from a driving power supply for the detection signal transmitting part.

6 Claims, 8 Drawing Sheets

PRIMARY CONTROL TYPE SWITCHING POWER SUPPLY CIRCUIT

BACKGROUND OF THE INVENTION

The present invention generally relates to switching power supply circuits, and more particularly to a switching power supply circuit which can operates a secondary side output voltage detection circuit even in response to a low output voltage.

In transmission systems, switching systems and the like, a driving power supply for electronic circuits uses an A.C. converter system in order to avoid undesirable effects of external noise, surge and the like. Hence, a D.C. power supply which is isolated from a main power supply via a transformer is used as the driving power supply for supplying a voltage lower than a voltage supplied by the main power supply. For example, the main power supply supplies a voltage of −48 V. For this reason, a detection signal of an output voltage detection circuit provided on a secondary side of the transformer is used to carry out a control on a primary side via a photocoupler or the like, so as to stabilize an output voltage.

Conventionally, a D.C. voltage of 5 V, 12 V or the like is supplied by the above described driving power supply for the electronic circuits. However, the voltage supplied by the driving power supply has decreased as the integration density of the electronic circuits (that is, integrated circuits or ICs) improved, and there are demands to enable the use of a voltage of 3 V or less.

However, if an output voltage of a switching power supply circuit is low, the output voltage detection circuit provided on the secondary side cannot operate. Hence, in such a case, it is necessary to provide an independent power supply circuit for the output voltage detection circuit so that the switching power supply circuit can operate.

Figure 1A:
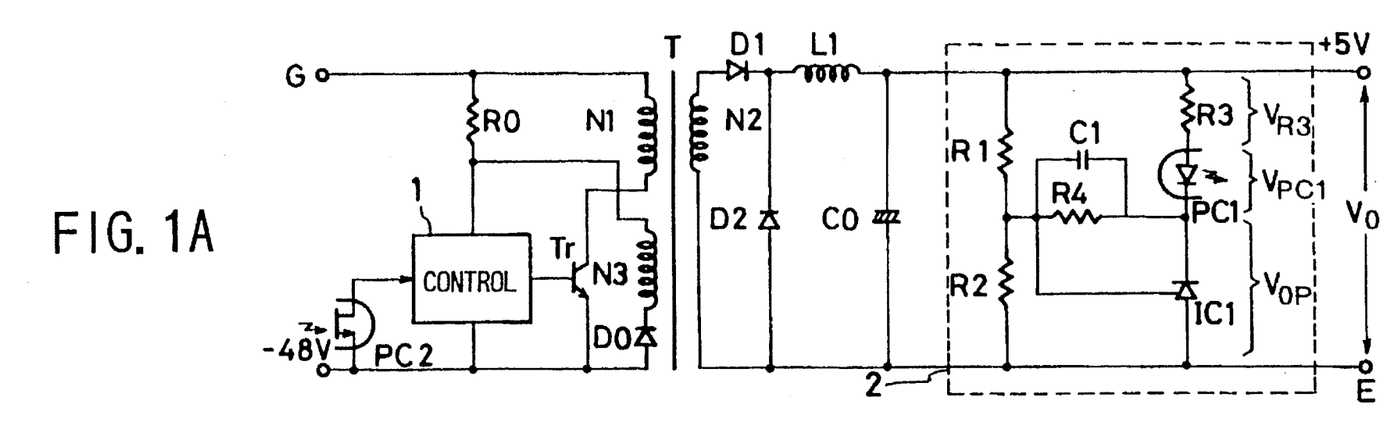
FIGS. 1A and 1B respectively are circuit diagrams showing a conceivable primary control type switching power supply circuit and an output voltage detection circuit thereof.
Figure 1B:
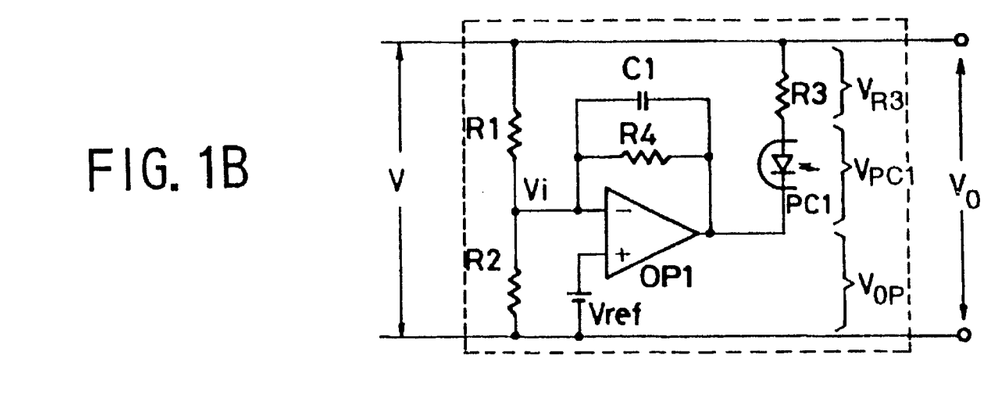

FIGS. 1A and 1B are circuit diagrams for explaining a conceivable primary control type switching power supply circuit. FIG. 1A shows the primary control type switching power supply circuit, and FIG. 1B shows an output voltage detection circuit of the primary control type switching power supply circuit in more detail.

In FIG. 1A, a transformer T is used for A.C. conversion and includes windings N1, N2 and N3. A switching transistor Tr has a base that receives a driving signal from a control circuit 1, and intermittently supplies a current from a −48 V power supply via the primary winding N1, so as to generate a rectangular wave voltage at the secondary winding N2. The control circuit 1 operates in response to a power supply voltage from the −48 V power supply received via a resistor R0 at the time of a start. After the start, the control circuit 1 operates in response to a voltage that is obtained by rectifying a voltage generated at a third winding N3 by a diode D0.

A light receiving side PC2 of a photocoupler receives light from a light emitting side PC1 of the photocoupler of an output voltage detection circuit 2 which is provided on the secondary side. The light receiving side PC2 supplies to the control circuit 1 a control signal which varies depending on a magnitude of an optical signal received from the light emitting side PC1. Hence, the control circuit 1 controls the driving signal supplied to the switching transistor Tr in response to the control signal, so as to maintain an output voltage $V_0$ constant.

Diodes D1 and D2 rectify the rectangular wave voltage at the secondary winding N2. A choke L1 and a capacitor C0 form a smoothing circuit, and a rectified voltage obtained via the diodes D1 and D2 is passed through this smoothing circuit so as to generate an output voltage $V_0$ of +5 V.

An output voltage detection circuit 2 includes a variable constant voltage generation circuit IC1, and has a circuit construction shown in FIG. 1B. In FIG. 1B, an operational amplifier OP1 compares a voltage $V_i$ that is obtained by dividing the output voltage $V_0$ by resistors R1 and R2 with a reference voltage $V_{ref}$, and generates an output voltage $V_{OP}$ depending on an error voltage that is obtained as a result of the comparison. Hence, a voltage $V_{PC1}$ of the light emitting side PC1 of the photocoupler-changes, and the magnitude of the optical signal generated from the light emitting side PC1 accordingly changes. Since the light receiving side PC2 of the photocoupler receives this optical signal from the light emitting side PC1, a control is carried out via the Control circuit 1 so that the output voltage $V_0$ is maintained constant.

In this state, the following relationship stands between the output voltage $V_0$ and the voltages at various parts of the output voltage detection circuit 2, where $V_{R3}$ denotes a voltage drop across a resistor R3 that is inserted in series with the light emitting side PC1 of the photocoupler.

$$V_0 = V_{R3} + V_{PC1} + V_{OP} \tag{1}$$

If $V_{REF} = 2.5$ V, $$V_{OP} > 2.5 \text{ V} \tag{2}$$

Generally, $$V_{PC1} > 1.5 \text{ V} \tag{3}$$

Accordingly, the output voltage $V_0$ can be described as follows based on the relationships (1) through (3) above.

$$V_0 > 4 \text{ V}$$

According to the conceivable primary control type switching power supply circuit shown in FIG. 1, it is impossible to operate the output voltage detection circuit 2 on the secondary side if the output voltage $V_0$ is set to a low voltage of 3 V, for example.

Figure 2:
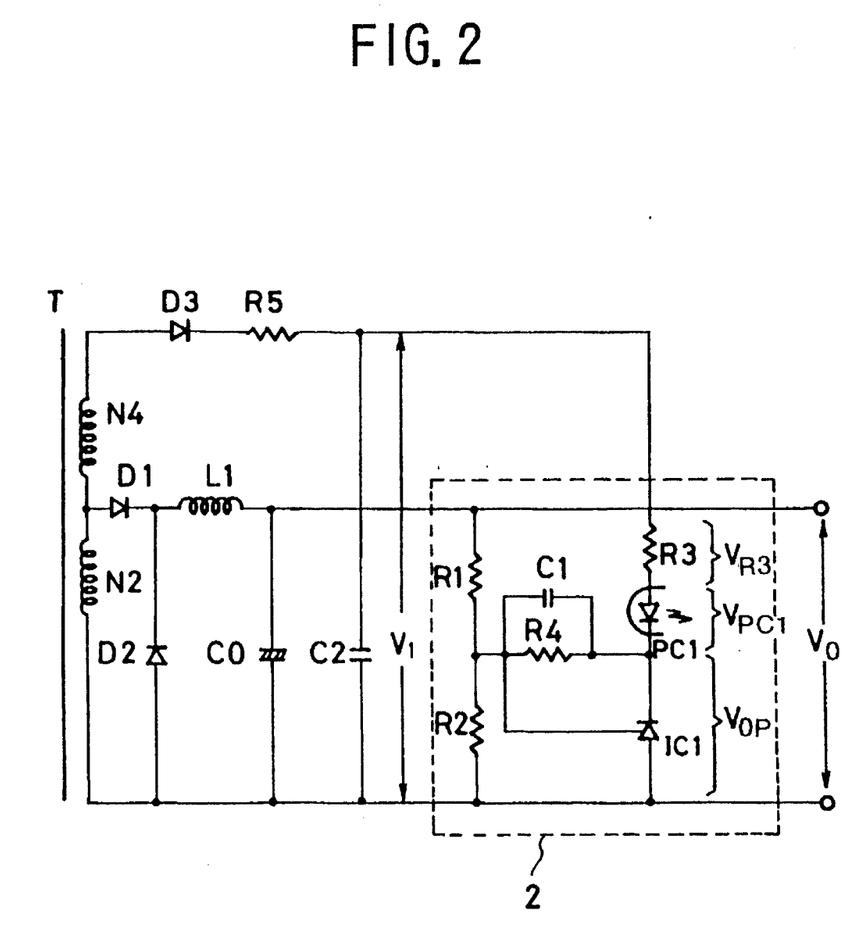
FIG. 2 is a circuit diagram showing another conceivable primary control type switching power supply circuit.

FIG. 2 is a circuit diagram showing another conceivable primary control type switching power supply circuit. In FIG. 2, those parts which are the same as those corresponding parts in FIGS. 1A and 1B are designated by the same reference numerals, and a description thereof will be omitted.

In FIG. 2, the transformer T includes a fourth winding N4. In addition, a rectifying diode D3, a resistor R5 and a smoothing capacitor C2 are additionally provided.

In FIG. 2, the fourth winding N4 is connected in series to the secondary winding N2. The diode D3 rectifies a voltage which is obtained by adding voltages generated by the secondary and fourth windings N2 and N4. This rectified voltage is supplied to a smoothing circuit which is made up of the resistor R5 and the capacitor C2, so as to generate an output voltage $V_1$. This output voltage $V_1$ is applied to the resistor R3, the light emitting side PC1 of the photocoupler, and the variable constant voltage generation circuit IC1.

Due to the provision of the fourth winding N4, the output voltage $V_1$ can be made higher than the output voltage $V_0$ by an arbitrary amount. Hence, according to the primary control type switching power supply circuit shown in FIG. 2, the output voltage detection circuit 2 can operate even if the output voltage $V_0$ is set to a low voltage of 3 V, for example.

Therefore, in the case of the conceivable primary control type switching power supply circuit shown in FIG. 1, there was a problem in that the output voltage detection circuit 2 on the secondary side cannot operate if the output voltage $V_0$ is a low voltage of 3 V, for example.

On the other hand, it is conceivable to provide the fourth winding N4 as shown in FIG. 2 so as to generate a higher driving power supply voltage, so that the output voltage detection circuit 2 can operate. However, in this case, there was a problem in that it is difficult to reduce the size and thickness of the transformer T because of the increased number of windings. In other words, it was difficult to satisfy limitations such as a number of terminals, areas of windows for the windings in an iron core and the like which form the restricting conditions related to reducing the size and thickness of the transformer T.

SUMMARY OF THE INVENTION

Accordingly, it is a general object of the present invention to provide a novel and useful switching power supply circuit in which the problems described above are eliminated.

Another and more specific object of the present invention is to provide a primary control type switching power supply circuit comprising a transformer having a primary side and a secondary side, a control circuit generating a control signal based on a detection signal, means for switching a current flowing through the primary side in response to the control signal so as to generate an A.C. voltage on the secondary side, rectifying and smoothing means for rectifying and smoothing the A.C. voltage to generate an output voltage across first and second terminals, an output voltage detection circuit including means for comparing a reference voltage and a detection voltage that is based on the output voltage, and a detection signal transmitting part supplying to the control circuit the detection signal which is indicative of an error between the reference voltage and the detection voltage so that the output voltage is maintained constant based on the control signal, and means, including a choke coupled to one of the first and second terminals, for turning the output voltage ON/OFF via the choke at a switching frequency and for obtaining a D.C. voltage by rectifying and smoothing an induced voltage of the choke caused by the ON/OFF of the output voltage, where the D.C. voltage is supplied to the detection signal transmitting part of the output voltage detection circuit as a driving voltage from a driving power supply for the detection signal transmitting part. According to the primary control type switching power supply circuit of the present invention, it is possible to operate the output voltage detection circuit on the secondary side even when the output voltage is low. In addition, since it is unnecessary to provide additional windings on the transformer and only small parts need to be added to the primary control type switching power supply circuit, there are virtually no restrictions as to the size, mounting space and the like with respect to the primary control type switching power supply circuit.

Still another object of the present invention is to provide a primary control type switching power supply circuit comprising a transformer having a primary side and a secondary side, a control circuit generating a control signal based on a detection signal, means for switching a current flowing through the primary side in response to the control signal so as to generate an A.C. voltage on the secondary side, rectifying and smoothing means for rectifying and smoothing the A.C. voltage to generate an output voltage across first and second terminals, an output voltage detection circuit including means for comparing a reference voltage and a detection voltage that is based on the output voltage, and a detection signal transmitting part supplying to the control circuit the detection signal which is indicative of an error between the reference voltage and the detection voltage so that the output voltage is maintained constant based on the control signal, and means, coupled to the rectifying and smoothing means, for obtaining a D.C. voltage by subjecting to a peak rectification a rectified voltage before it is smoothened in the rectifying and smoothing means on the secondary side, where the D.C. voltage is supplied to the detection signal transmitting part of the output voltage detection circuit as a driving voltage from a driving power supply for the detection signal transmitting part. According to the primary control type switching power supply circuit of the present invention, it is possible to operate the output voltage detection circuit on the secondary side even when the output voltage is low. In addition, since it is unnecessary to provide additional windings on the transformer and only small parts need to be added to the primary control type switching power supply circuit, there are virtually no restrictions as to the size, mounting space and the like with respect to the primary control type switching power supply circuit.

Other objects and further features of the present invention will be apparent from the following detailed description when read in conjunction with the accompanying drawings.

DESCRIPTION OF THE PREFERRED EMBODIMENTS

First, a description will be given of the operating principle of the present invention, by referring to FIG. 3.

Figure 3:
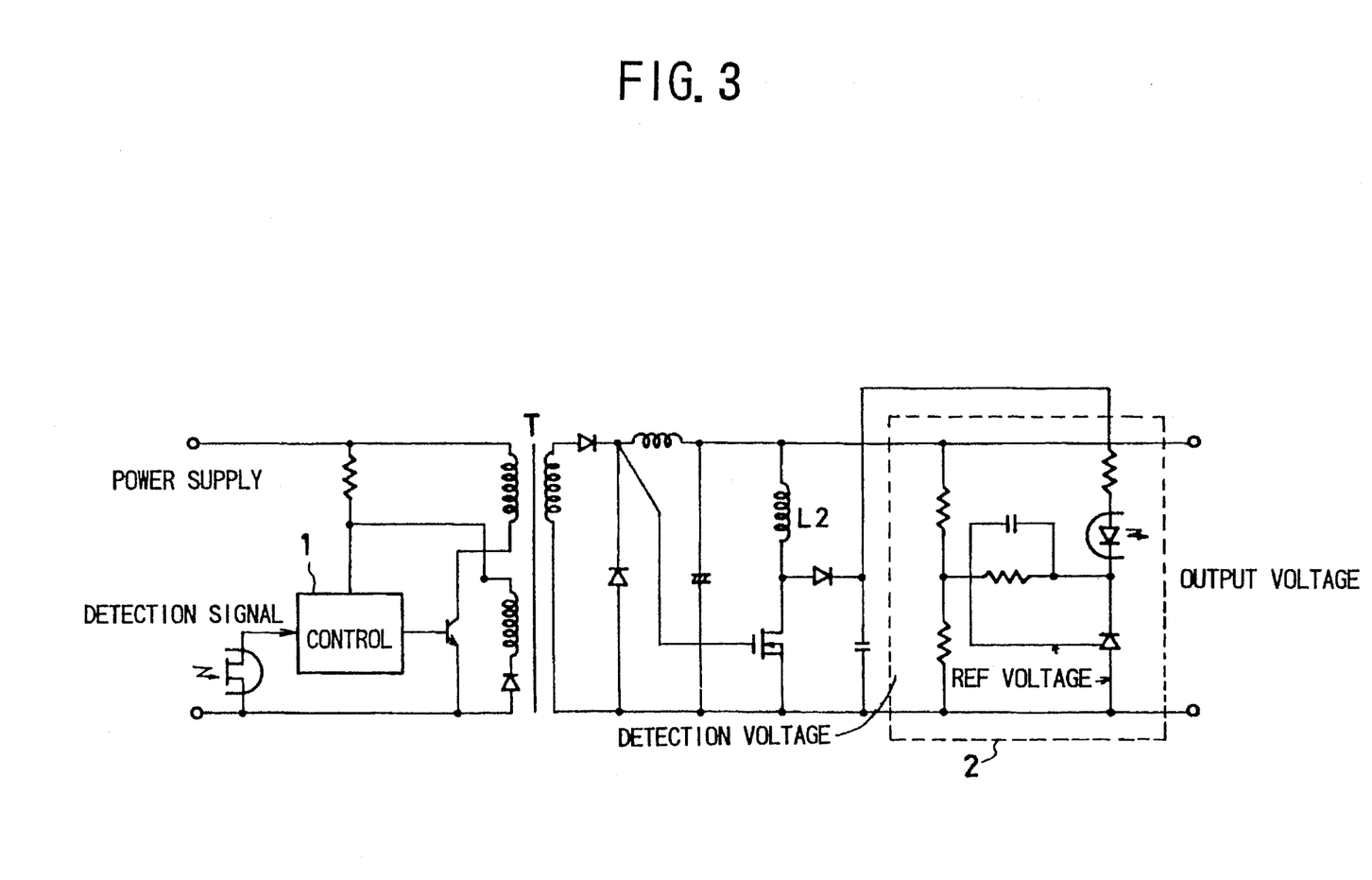
FIG. 3 is a circuit diagram for explaining the operating principle of the present invention.

In a primary control type switching power supply circuit shown in FIG. 3, a current on a primary side is switched depending on a control signal from a control circuit 1 that is provided on the primary side of a transformer T, and an output voltage is generated by rectifying and smoothing an A.C. voltage that is generated on a secondary side of the transformer T. An output voltage detection circuit 2 is provided on the secondary side of the transformer T and an error is detected between a reference voltage and a detection voltage based on the output voltage. A detection signal corresponding to this error is supplied to the control circuit 1, and the control circuit 1 generates a control signal in response to this detection signal so as to carry out a control to maintain the output voltage constant.

In the present invention, the output voltage is turned ON/FF at a switching frequency via a choke L2, and an induced voltage of the choke L2 is rectified and smoothened to obtain a D.C. voltage. This D.C. voltage (rectified voltage) that is output from a chopper circuit which is provided on the secondary side and operates at the switching frequency is supplied to a detection signal transmitting part of the output voltage detection circuit 2 as a driving voltage from a driving power supply.

Therefore, according to the present invention, even if the detection signal transmitting part of the output voltage detection circuit 2 provided on the secondary side cannot be operated because of the low output voltage of the switching power supply circuit, it is possible to operate the detection signal transmitting part, so that the output voltage detection circuit 2 can operate.

A voltage which is obtained by adding a predetermined voltage to the output voltage may be generated based on the rectified voltage output from the chopper circuit. In this case, the generated voltage can be used as the driving voltage from the driving power supply for the detection signal transmitting part of the output voltage detection circuit 2, and also as the detection voltage. Hence, the output voltage detection circuit can operate even when the detection voltage at the output voltage detection circuit 2 is lower than the reference voltage.

In the primary control type switching power supply circuit, it is possible to obtain a D.C. voltage by subjecting a rectified voltage on the secondary side before the smoothing to a peak ratification. In this case, this D.C. voltage can be supplied to the detection signal transmitting part of the output voltage detection circuit 2 as the driving voltage from the driving power supply. Thus, if the detection signal transmitting part of the output voltage detection circuit 2 provided on the secondary side cannot be operated because of the low output voltage of the switching power supply circuit, it is possible to supply the D.C. voltage to the detection signal transmitting part as the driving voltage from the driving power supply, so that the output voltage detection circuit 2 can operate.

Furthermore, a voltage which is obtained by adding a predetermined voltage to the output voltage may be generated based on the peak rectified voltage. In this case, the generated voltage can be used as the driving voltage from the driving power supply for the detection signal transmitting part of the output voltage detection circuit 2, and also as the detection voltage. Hence, the output voltage detection circuit can operate even when the detection voltage at the output voltage detection circuit 2 is lower than the reference voltage.

Figure 4:
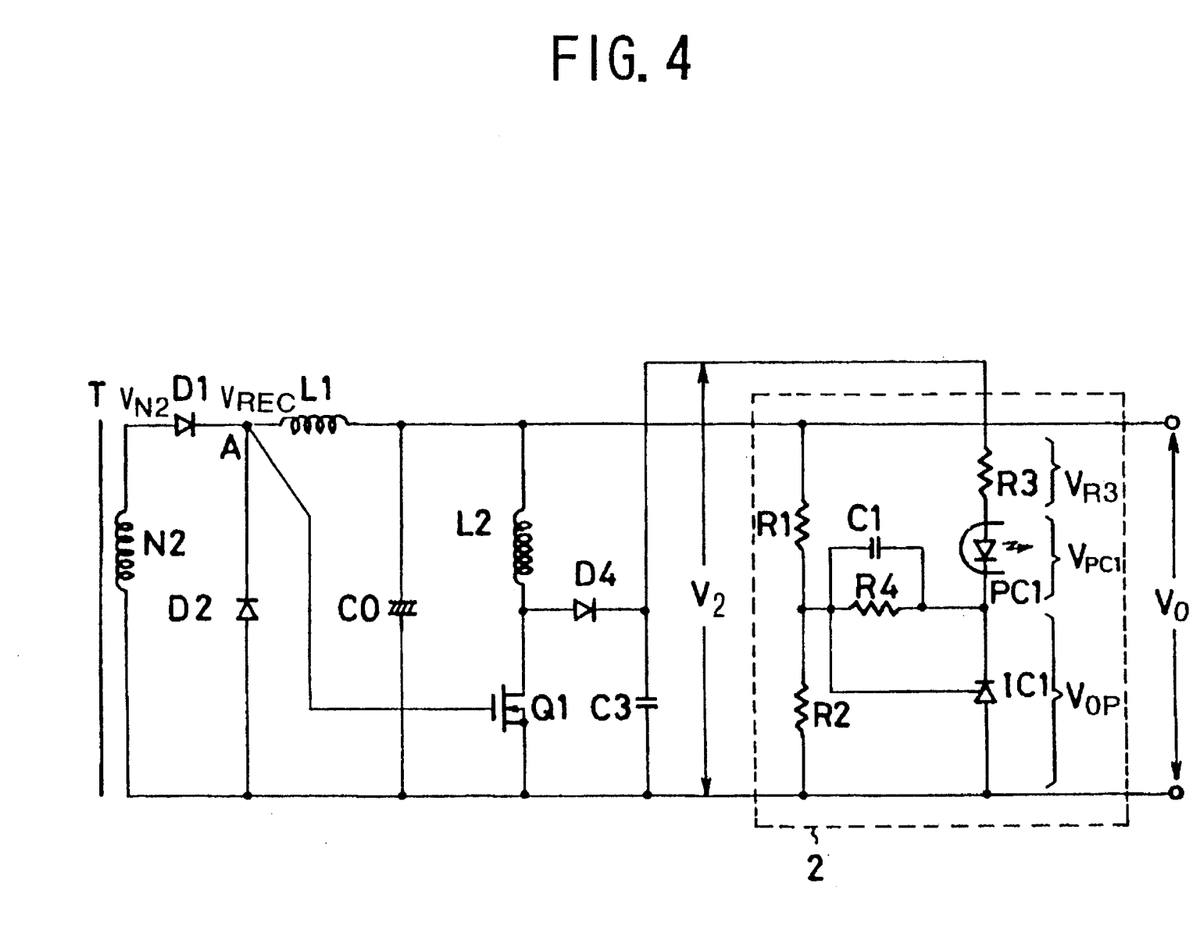
FIG. 4 is a circuit diagram showing an important part of a first embodiment of a primary control type switching power supply circuit according to the present invention.
Figure 5:
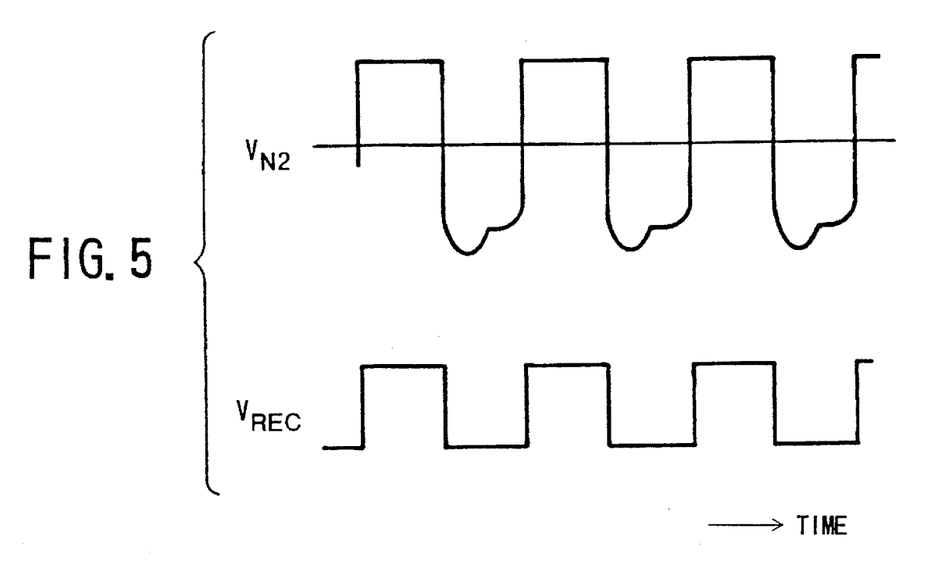
FIG. 5 is a timing chart for explaining the operation of the first embodiment.

Next, a description will be given of a first embodiment of the primary control type switching power supply circuit according to the present invention, by referring to FIGS. 4 and 5. FIG. 4 is a circuit diagram showing an important part of the first embodiment. In FIG. 4, those parts which are the same as those corresponding parts in FIG. 1A are designated by the same reference numerals, and a description thereof will be omitted. FIG. 5 is a timing chart for explaining the operation of the first embodiment.

In FIG. 4, the illustration of the primary side of the transformer T is omitted for the sake of convenience. A field effect transistor (FET) Q1, a choke L2, a rectifying diode D4 and a smoothing capacitor C3 are connected as shown.

FIG. 5 shows an output voltage $V_{N2}$ of the secondary winding N2 of the transformer T, and a rectified output voltage $V_{REC}$ obtained by the diodes D1 and D2.

In FIG. 4, the FET Q1 flows a current through the choke L2 when the rectified output voltage $V_{REC}$ shown in FIG. 5 at a node A in FIG. 4 is ON. On the other hand, when the rectified output voltage $V_{REC}$ at the node A is OFF, a current flows through the diode D4 due to an energy stored in the choke L2, and a smoothened output voltage $V_2$ is generated at the capacitor C3. This output voltage $V_2$ is applied to the resistor R3, the light emitting side PC1 of the photocoupler and the variable constant voltage generation circuit IC1.

Accordingly, the elements that are added in this first embodiment with respect to the conceivable primary control type switching power supply circuit forms a chopper circuit which operates at a switching frequency controlled by the control circuit 1 on the primary side.

In this case, the following relationship stands between the output voltage $V_2$ and the voltages at various parts of the output voltage detection circuit 2, similarly to the case described above in conjunction with FIGS. 1A and 1B, where the same voltage designations are used as before.

$$V_2 = V_{R3} + V_{PC1} + V_{OP} \tag{4}$$

Hence, it is necessary that the following relationship stands.

$$V_2 > 4 \text{ V} \tag{5}$$

The output voltage $V_2$ is added with the voltage that is generated by the chopper circuit, and is boosted with respect to the output voltage $V_0$. For this reason, it is possible to satisfy the relationships (4) and (5) described above. Therefore, the output voltage detection circuit 2 shown in FIG. 4 can operate even if the output voltage $V_0$ is low.

According to this first embodiment, the control voltage with respect to the variable constant voltage generation circuit IC1 is generated based on the output voltage $V_0$. Hence, if the output voltage $V_0$ is higher than the reference voltage $V_{ref}$ used within the primary control type switching power supply circuit shown in FIG. 4, no problems would occur. In other words, not problems would occur if the reference voltage $V_{ref}$ is 2.5 V and the output voltage $V_0$ is 3.3 V, for example. However, if the output voltage $V_0$ is 2.0 V, for example, and is lower than the reference voltage $V_{ref}$, the primary control type switching power supply circuit shown in FIG. 4 cannot be used.

Next, a description will be given of a second embodiment of the primary control type switching power supply circuit according to the present invention, by referring to FIG. 6.

Figure 6:
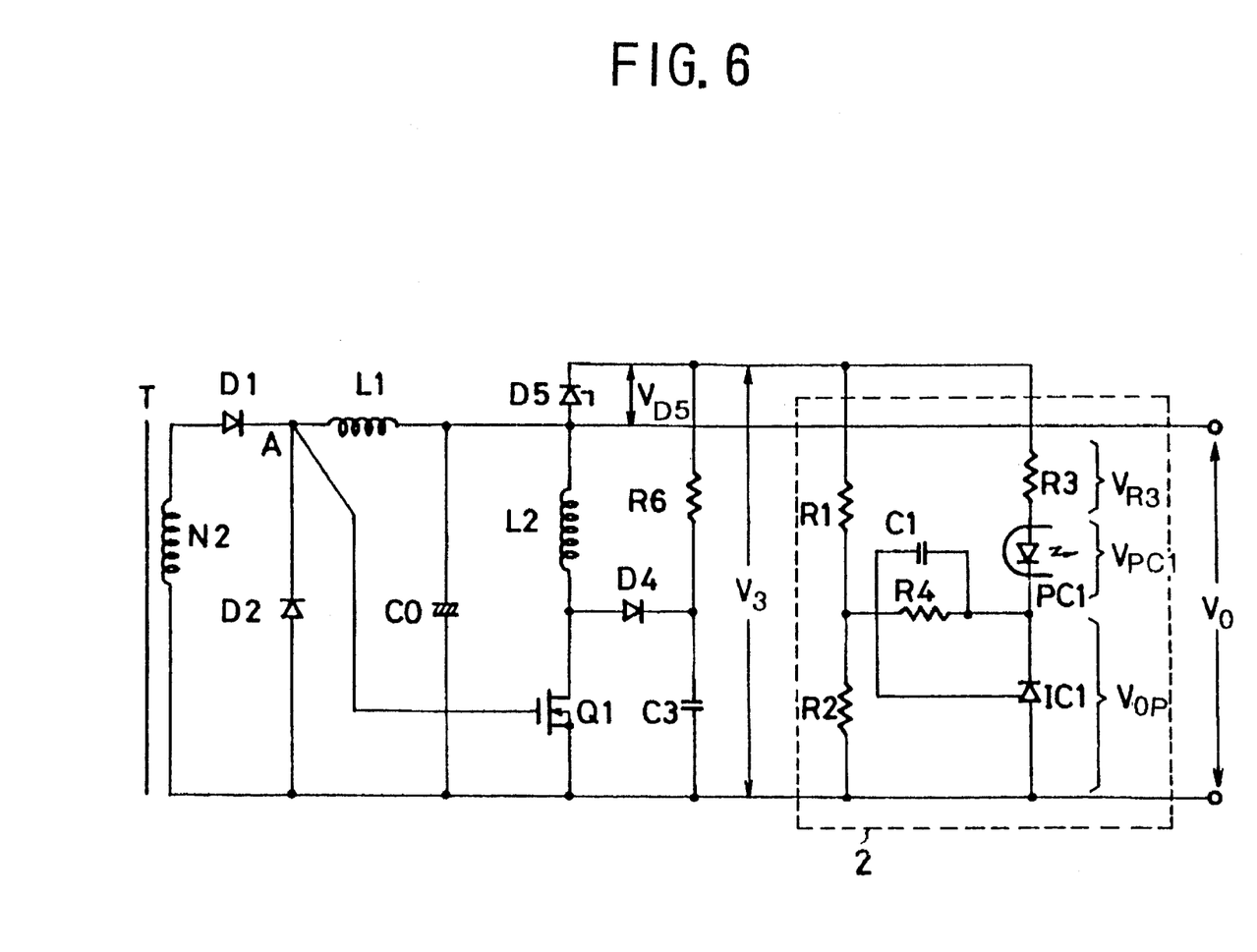
FIG. 6 is a circuit diagram showing an important part of a second embodiment of the primary control type switching power supply circuit according to the present invention.

FIG. 6 is a circuit diagram showing an important part of the second embodiment. In FIG. 6, those parts which are the same as those corresponding parts in FIG. 4 are designated by the same reference numerals, and a description thereof will be omitted.

In FIG. 6, a constant voltage element D5 and a resistor R6 are connected as shown. A high-precision Zenner diode may be used for the constant voltage element D5. Alternatively, it is possible to use a circuit similar to the variable constant voltage generation circuit IC1 shown in FIG. 4 for the constant voltage element D5.

In this second embodiment, the constant voltage element D5 is connected between one of two terminals across which the output voltage $V_0$ is obtained and an output of the power supply for the output voltage detection circuit 2 including the chopper circuit. The variable constant voltage generation circuit IC1 is connected to receive the control voltage from the output end of the constant voltage element D5.

When a voltage across the constant voltage element D5 is denoted by $V_{DS}$, a voltage $V_3$ with respect to the resistor R3, the light emitting side PC1 of the photocoupler and the variable constant voltage generation circuit IC1 can be described by the following.

$$V_3 = V_0 + V_{DS} = V_{R3} + V_{PC1} + V_{OP} \quad (6)$$

Accordingly, the output voltage $V_0$ can be described by the following.

$$V_0 = V_{R3} + V_{PC1} + V_{OP} - V_{DS} \quad (7)$$

Therefore, by appropriately selecting the voltage $V_{DS}$ across the constant voltage element D5, it is possible to use the primary control type switching power supply circuit shown in FIG. 6 even if the output voltage $V_0$ is lower than the reference voltage $V_{ref}$ of 2.5 V, for example, used within the circuit.

Next, a description will be given of a third embodiment of the primary control type switching power supply circuit according to the present invention, by referring to FIGS. 7 and 8.

Figure 7:
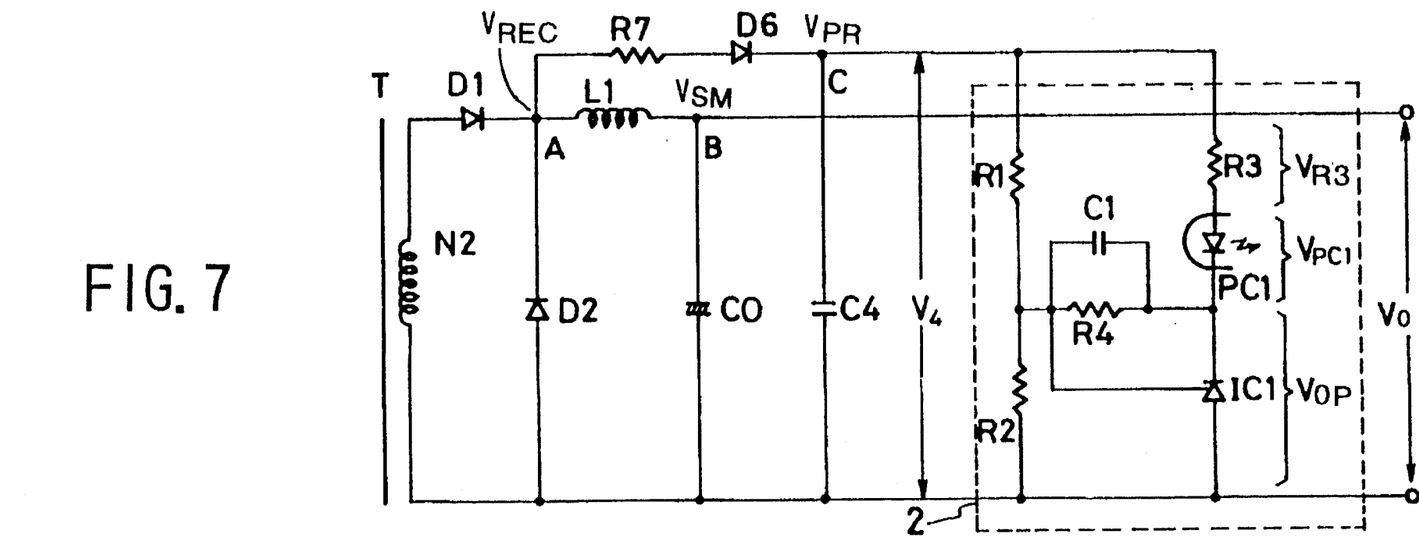
FIG. 7 is a circuit diagram showing an important part of a third embodiment of the primary control type switching power supply circuit according to the present invention.

FIG. 7 is a circuit diagram showing an important part of the third embodiment. In FIG. 7, those parts which are the same as those corresponding parts in FIG. 4 are designated by the same reference numerals, and a description thereof will be omitted.

In FIG. 7, a resistor R7, a rectifying diode D6 and a smoothing capacitor C4 are connected as shown.

Figure 8:
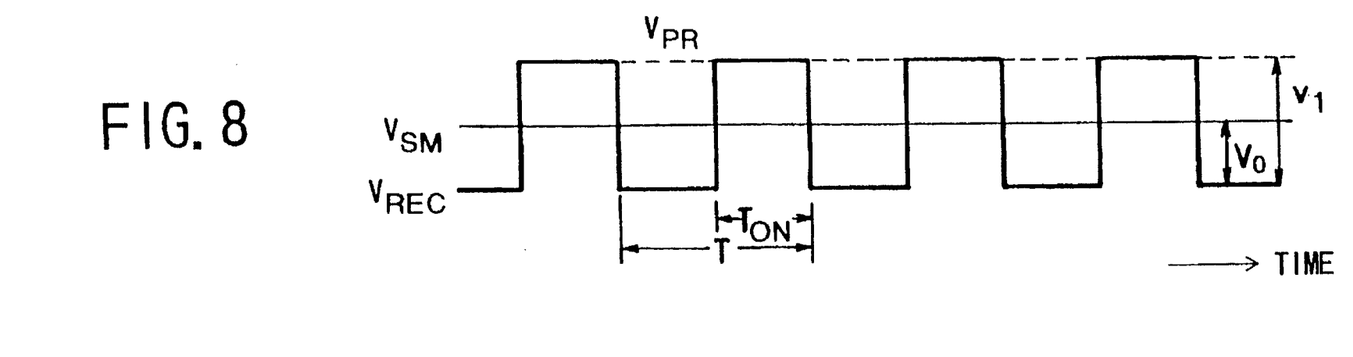
FIG. 8 is a timing chart for explaining the operation of the third embodiment.

FIG. 8 is a timing chart for explaining the operation of the third embodiment. FIG. 8 shows a rectified output voltage $V_{REC}$ at a node A obtained by the diodes D1 and D2, a smoothened output voltage $V_{SM}$ at a node B, and a peak rectified output voltage $V_{PR}$ at a node C.

In FIG. 7, the rectified output voltage $V_{REC}$ at the node A that is obtained by rectifying the voltage generated from the secondary winding N2 of the transformer T has a waveform shown in FIG. 8. If the duty of the switching is 50%, the following relationship stands between a time T amounting to 1 period of the rectified output voltage $V_{REC}$ and an ON time $T_{ON}$ of the rectified output voltage $V_{REC}$.

$$T_{ON}/T = 0.5 \quad (8)$$

Hence, a peak voltage $V_1$ of the peak rectified output voltage $V_{PR}$ at the node C and smoothened output voltage $V_{SM}$ at the node B, that is, the output voltage $V_0$, satisfy the following relationship.

$$V_1 = V_0 \times 2 \quad (9)$$

Accordingly, if the output voltage $V_0$ is 3 V, for example, it is possible to generate a voltage of approximately 6 V as an output voltage $V_4$ that is obtained by subjecting the rectified output voltage $V_{REC}$ at the node A to the peak rectification. In other words, it is possible to obtain a sufficiently large voltage for driving the circuit that includes the resistor R3, the light emitting side PC1 of the photocoupler and the variable constant voltage generation circuit IC1.

Next, a description will be given of a fourth embodiment of the primary control type switching power supply circuit according to the present invention, by referring to FIG. 9.

Figure 9:
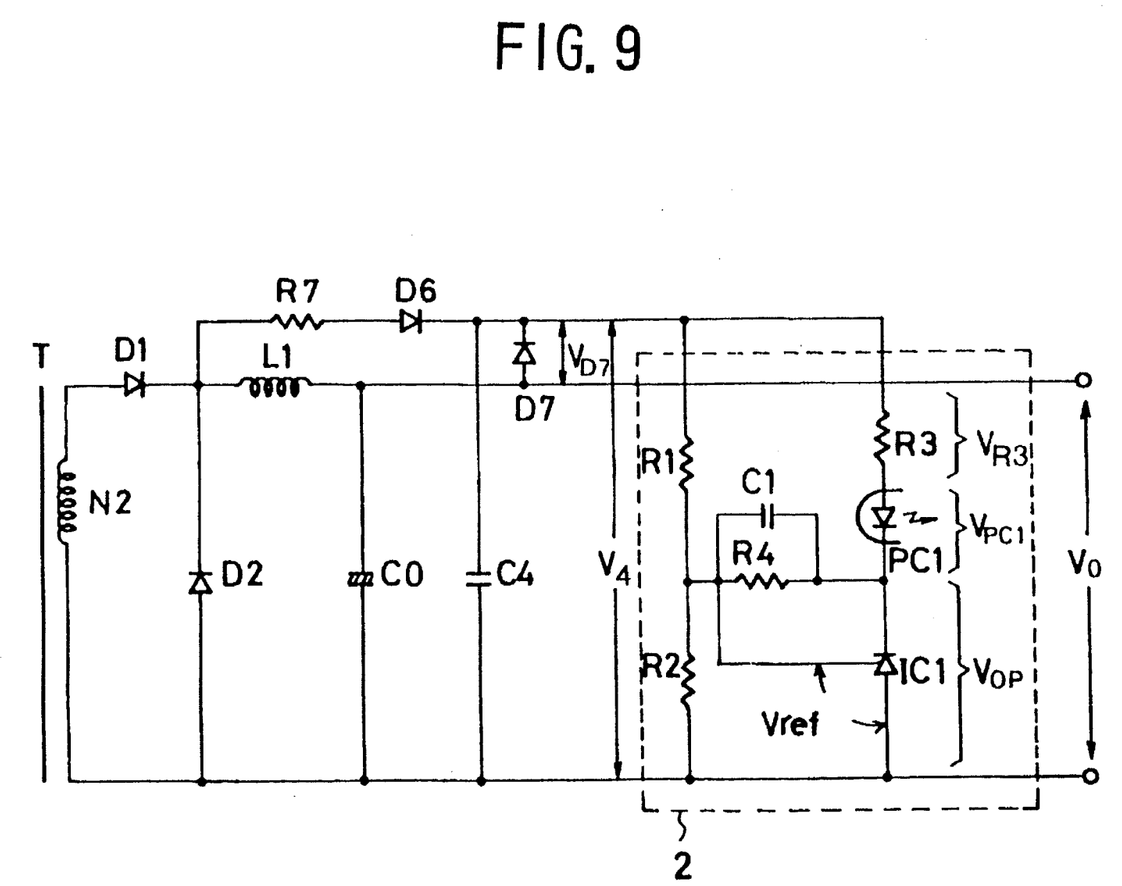
FIG. 9 is a circuit diagram showing an important part of a fourth embodiment of the primary control type switching power supply circuit according to the present invention.

FIG. 9 is a circuit diagram showing an important part of the fourth embodiment. In FIG. 9, those parts which are the same as those corresponding parts in FIG. 7 are designated by the same reference numerals, and a description thereof will be omitted.

In FIG. 9, a constant voltage element D7 is connected as shown. A high-precision Zenner diode may be used for the constant voltage element D7. Alternatively, it is possible to use a circuit similar to the variable constant voltage generation circuit IC1 shown in FIG. 4 for the constant voltage element D7.

In this fourth embodiment, the constant voltage element D7 is connected between one of two terminals across which the output voltage $V_0$ is obtained and the output of the peak rectifying circuit that outputs the output voltage $V_4$. The variable constant voltage generation circuit IC1 is connected to receive the control voltage from the output end of the constant voltage element D7.

When a voltage across the constant voltage element D7 is denoted by $V_{D7}$, the voltage $V_4$ with respect to the resistor R3, the light emitting side PC1 of the photocoupler and the variable constant voltage generation circuit IC1 can be described by the following.

$$\begin{aligned} V_4 &= V_0 + V_{D7} \\ &= (V_{ref}/R2) \times (R1 + R2) \end{aligned} \quad (10)$$

Accordingly, the output voltage $V_0$ can be described by the following.

$$V_0 = (V_{ref}/R2) \times (R1+R2) - V_{D7} \quad (11)$$

Therefore, by appropriately selecting the voltage $V_{D7}$ across the constant voltage element D7, it is possible to use the primary control type switching power supply circuit shown in FIG. 9 even if the output voltage $V_0$ is lower than the reference voltage $V_{ref}$ of 2.5 V, for example, used within the circuit.

Further, the present invention is not limited to these embodiments, but various variations and modifications may be made without departing from the scope of the present invention.

What is claimed is:

1. A primary control type switching power supply circuit comprising:

a transformer having a primary side and a secondary side;

a control circuit, coupled to the primary side of said transformer, for generating a control signal based on a detection signal;

switching means for switching a current flowing through the primary side in response to the control signal so as to generate an A.C. voltage on the secondary side;

rectifying and smoothing means for rectifying and smoothing the A.C. voltage to generate an output voltage across first and second terminals;

an output voltage detection circuit including means for comparing a reference voltage and a detection voltage which is based on the output voltage, and a detection signal transmitting part supplying to said control circuit the detection signal which is indicative of an error between the reference voltage and the detection voltage so that the output voltage is maintained constant based on the control signal; and means, including a choke coupled to one of the first and second terminals, for turning the output voltage ON/OFF via the choke at a switching frequency and for obtaining a D.C. voltage by rectifying and smoothing an induced voltage of the choke caused by the ON/OFF of the output voltage, said D.C. voltage being supplied to the detection signal transmitting part of said output voltage detection circuit as a driving voltage from a driving power supply for the detection signal transmitting part, said D.C. voltage being greater than or equal to a minimum voltage which is required to operate the detection signal transmitting part so as to ensure operation of said output voltage detection circuit.

2. The primary control type switching power supply circuit as claimed in claim 1, which further comprises:

adding means for adding a voltage to the output voltage based on the D.C. voltage so as to obtain a predetermined voltage, said predetermined voltage being supplied to the detection signal transmitting part of said output voltage detection circuit as the driving voltage from the driving power supply in place of the D.C. voltage, and also being used as the detection voltage.

3. The primary control type switching power supply circuit as claimed in claim 1, wherein said control circuit controls the switching frequency.

4. A primary control type switching power supply circuit comprising:

a transformer having a primary side and a secondary side;

a control circuit, coupled to the primary side of said transformer, for generating a control signal based on a detection signal;

switching means for switching a current flowing through the primary side in response to the control signal so as to generate an A.C. voltage on the secondary side;

rectifying and smoothing means for rectifying and smoothing the A.C. voltage to generate an output voltage across first and second terminals;

an output voltage detection circuit including means for comparing a reference voltage and a detection voltage that is based on the output voltage, and a detection signal transmitting part supplying to said control circuit the detection signal which is indicative of an error between the reference voltage and the detection voltage so that the output voltage is maintained constant based on the control signal; and means, coupled to said rectifying and smoothing means, for obtaining a D.C. voltage by subjecting a rectified voltage to a peak rectification before the rectified voltage is smoothened in said rectifying and smoothing means on the secondary side, said D.C. voltage being supplied to the detection signal transmitting part of said output voltage detection circuit as a driving voltage from a driving power supply for the detection signal transmitting part, said D.C. voltage being greater than or equal to a minimum voltage which is required to operate the detection signal transmitting part so as to ensure operation of said output voltage detection circuit.

5. The primary control type switching power supply circuit as claimed in claim 4, which further comprises:

adding means for adding a voltage to the output voltage based on the D.C. voltage so as to obtain a predetermined voltage, said predetermined voltage being supplied to the detection signal transmitting part of said output voltage detection circuit as the driving voltage from the driving power supply in place of the D.C. voltage, and also being used as the detection voltage.

6. The primary control type switching power supply circuit as claimed in claim 4, wherein said control circuit controls the switching frequency.

* * * * *